(12) United States Patent
Okano et al.

(10) Patent No.: US 9,091,578 B2
(45) Date of Patent: Jul. 28, 2015

(54) THERMAL FLOW RATE SENSOR

(71) Applicant: HORIBA STEC, Co., Ltd., Kyoto-shi, Kyoto (JP)

(72) Inventors: Hiroyuki Okano, Kyoto (JP); Takashi Shirai, Otsu (JP)

(73) Assignee: HORIBA STEC, Co. Ltd., Kyoto-shi (JP)

( * ) Notice: Subject to any disclaimer, the term of this patent is extended or adjusted under 35 U.S.C. 154(b) by 0 days.

(21) Appl. No.: 13/727,337

(22) Filed: Dec. 26, 2012

(65) Prior Publication Data

US 2013/0160540 A1 Jun. 27, 2013

(30) Foreign Application Priority Data

Dec. 27, 2011 (JP) .................................. 2011-286701

(51) Int. Cl.
- *G01F 1/684* (2006.01)
- *G01F 1/696* (2006.01)
- *G05D 7/06* (2006.01)

(52) U.S. Cl.
CPC .............. *G01F 1/684* (2013.01); *G01F 1/6842* (2013.01); *G01F 1/696* (2013.01); *G05D 7/0635* (2013.01)

(58) Field of Classification Search
CPC ......... G01F 1/684; G01F 1/69; G01F 1/6847; G01F 1/696; G01F 1/6965; G01F 1/698; G01F 1/699
USPC ...................................... 73/202.5, 204.27, 17
See application file for complete search history.

(56) References Cited

U.S. PATENT DOCUMENTS

| | | | |
|---|---|---|---|
| 2001/0027684 A1* | 10/2001 | Lotters et al. | 73/204.27 |
| 2002/0121136 A1* | 9/2002 | Rudent et al. | 73/204.25 |
| 2003/0182999 A1* | 10/2003 | Kouno | 73/204.21 |
| 2003/0236638 A1* | 12/2003 | Shajii et al. | 702/45 |
| 2004/0194544 A1* | 10/2004 | Tokuhisa et al. | 73/204.11 |
| 2004/0204885 A1* | 10/2004 | Wang et al. | 702/45 |
| 2006/0101907 A1* | 5/2006 | Shajii et al. | 73/202.5 |
| 2007/0084280 A1* | 4/2007 | Gill et al. | 73/204.27 |
| 2007/0220968 A1* | 9/2007 | Tokuyasu et al. | 73/204.26 |
| 2007/0251315 A1* | 11/2007 | Sukegawa et al. | 73/204.27 |
| 2008/0211510 A1* | 9/2008 | Zolock et al. | 324/451 |
| 2008/0250854 A1* | 10/2008 | Ding et al. | 73/198 |
| 2010/0000608 A1* | 1/2010 | Goto et al. | 137/2 |
| 2010/0089459 A1* | 4/2010 | Smirnov et al. | 73/204.15 |
| 2010/0163119 A1* | 7/2010 | Isobe et al. | 73/861.351 |
| 2011/0023597 A1* | 2/2011 | Nakano et al. | 73/204.25 |
| 2011/0296910 A1* | 12/2011 | Lopez et al. | 73/204.27 |

FOREIGN PATENT DOCUMENTS

JP 2009300403 A 12/2009

* cited by examiner

*Primary Examiner* — Lisa Caputo
*Assistant Examiner* — Philip Cotey
(74) *Attorney, Agent, or Firm* — Alleman Hall McCoy Russell & Tuttle LLP (57) ABSTRACT

A thermal flow rate sensor is provided which includes a main flow path through which a fluid flows, and a sensor flow path that branches off from the main flow path so as to cause the fluid to flow in a split flow and that is provided with a flow rate detecting mechanism configured to detect a flow rate of the fluid. The flow rate detecting mechanism includes an upstream-side coil and a downstream-side coil, each configured by using a heat-generating resistance wire wound around a sensor flow pipe forming the sensor flow path. A peak position of a temperature distribution generated in the sensor flow path by the upstream-side coil and the downstream-side coil is positioned on the upstream-side coil side relative to the middle position between the upstream-side coil and the downstream-side coil on the sensor flow path.

12 Claims, 11 Drawing Sheets

(a) UPSTREAM COIL TEMPERATURE=DOWNSTREAM COIL TEMPERATURE (WHILE NO FLUID IS FLOWING)

(b) UPSTREAM COIL TEMPERATURE>DOWNSTREAM COIL TEMPERATURE (WHILE NO FLUID IS FLOWING)

CONVENTIONAL CONSTANT CURRENT CONTROLLING METHOD

THERMAL FLOW RATE SENSOR

TECHNICAL FIELD

The present invention relates to a thermal flow rate sensor.

BACKGROUND ART

An example of conventional thermal flow rate sensors includes, as described in Patent Document 1: a main flow path through which a fluid flows; and a sensor flow path that branches off from the main flow path so as to cause the fluid to flow in a split flow and is provided with a flow rate detecting mechanism configured to detect a flow rate of the fluid.

Figure 10:
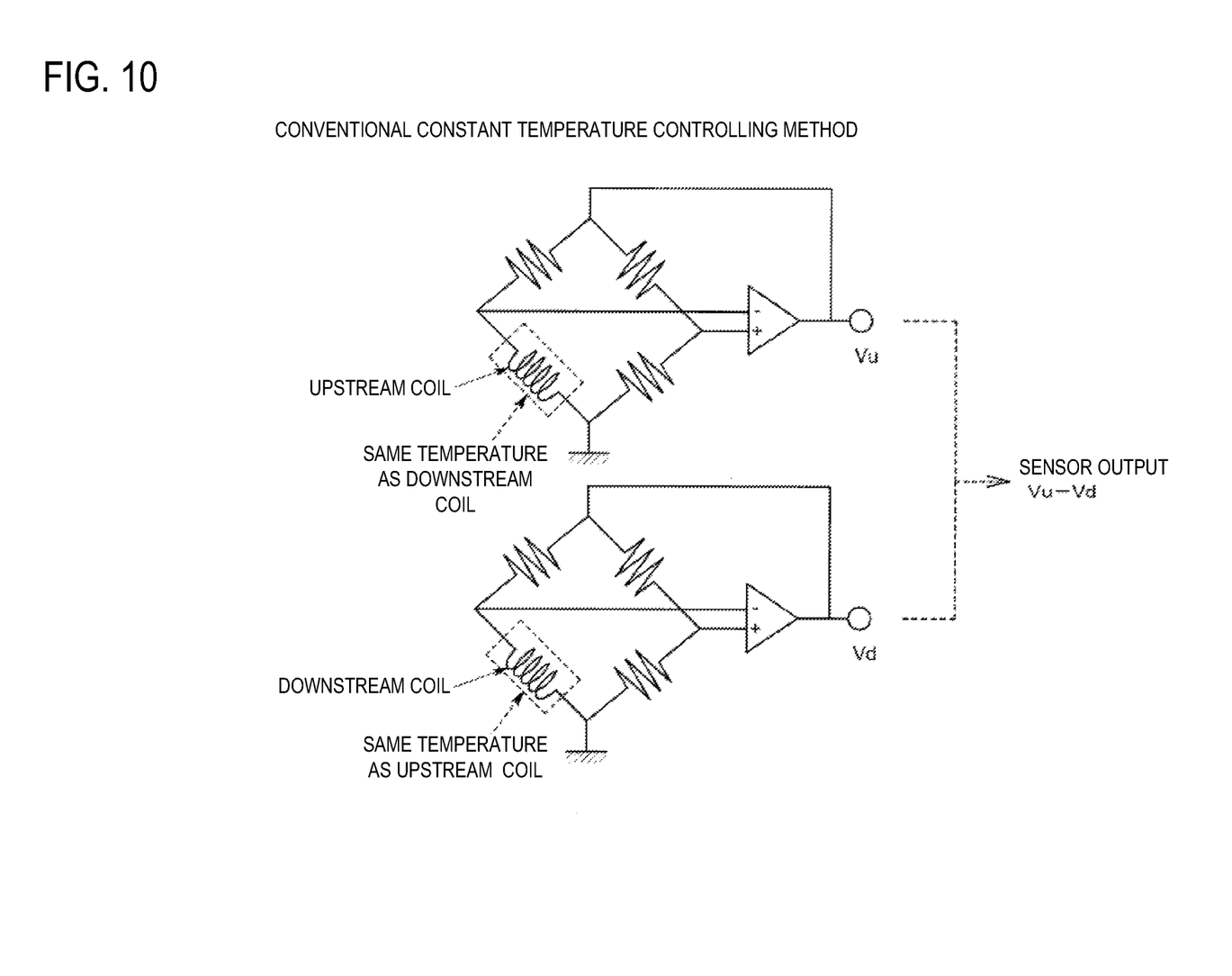
FIG. 10 is a circuit diagram for explaining a conventional constant temperature method.

An example of the flow rate detecting mechanism is configured so that, as shown in FIG. 10, a sensor flow pipe forming the sensor flow path is provided with an upstream-side coil and a downstream-side coil that are independent of each other and that are each configured by using a heat-generating resistor of which the resistance value changes in accordance with temperature, the flow rate detecting mechanism being further provided with: an upstream-side constant temperature controlling circuit that has a bridge circuit including the upstream-side coil; and a downstream-side constant temperature controlling circuit that has a bridge circuit including the downstream-side coil. Further, the constant temperature controlling circuits control the temperatures of the upstream-side coil and the downstream-side coil so as to be equal to each other and to be constant at all times. The flow rate detecting mechanism is configured to calculate a flow rate Q based on a formula such as, for example, $(Vu-Vd)/(Vu+Vd)$ or $(Vu-Vd)$, where Vu denotes an output voltage of the upstream-side constant temperature controlling circuit, whereas Vd denotes an output voltage of the downstream-side constant temperature controlling circuit.

In other words, the thermal flow rate sensor is configured in such a manner that, when a fluid flows through the sensor flow path, because heat is taken from the upstream-side coil by the fluid, the electric power required to keep the temperature of the upstream-side coil constant increases, and the output voltage Vu of the upstream-side constant temperature controlling circuit therefore becomes higher. In contrast, because heat is given to the downstream-side coil by the fluid, the electric power required to keep the temperature of the downstream-side coil constant decreases, and the output voltage Vd of the downstream-side constant temperature controlling circuit therefore becomes lower.

Incidentally, when a gas having high thermal conductivity (e.g., He, $H_2$, or the like) is used, because the amount of heat taken from the upstream-side coil provided on the sensor flow path is efficiently transferred to the downstream-side coil provided on the sensor flow path, the linearity of flow rate output characteristics of the thermal flow rate sensor with respect to the flow rate of the fluid flowing through the sensor flow path is relatively good.

However, when a gas having low thermal conductivity (e.g., $SF_6$, $CF_4$, or the like) is used, because the efficiency of the heat transfer is low in transferring the amount of heat taken from the upstream-side coil provided on the sensor flow path to the downstream-side coil provided on the sensor flow path, the linearity of the flow rate output characteristics of the thermal flow rate sensor with respect to the flow rate of the fluid flowing through the sensor flow path is not satisfactory. In particular, a problem is that, as the flow rate of the fluid flowing through the sensor flow path increases, the output voltage Vd of the downstream-side constant temperature controlling circuit tends to become saturated so that the linearity deteriorates. The degree by which the linearity deteriorates is different for each thermal flow rate sensor. Thus, a problem arises where, when the standard curve of each thermal flow rate sensor is corrected by using the standard curve of a thermal flow rate sensor used as a reference, it is difficult to accurately perform, for example, a span correction on the standard curves by performing a one-point correction. In other words, when the linearity of the standard curve of each thermal flow rate sensor is not maintained, even if a one-point correction is made, the level of precision of the corrections in the parts other than the one point is not satisfactory. As a result, a problem arises where the level of precision of the process to measure an actual gas flow rate deteriorates.

Figure 11:
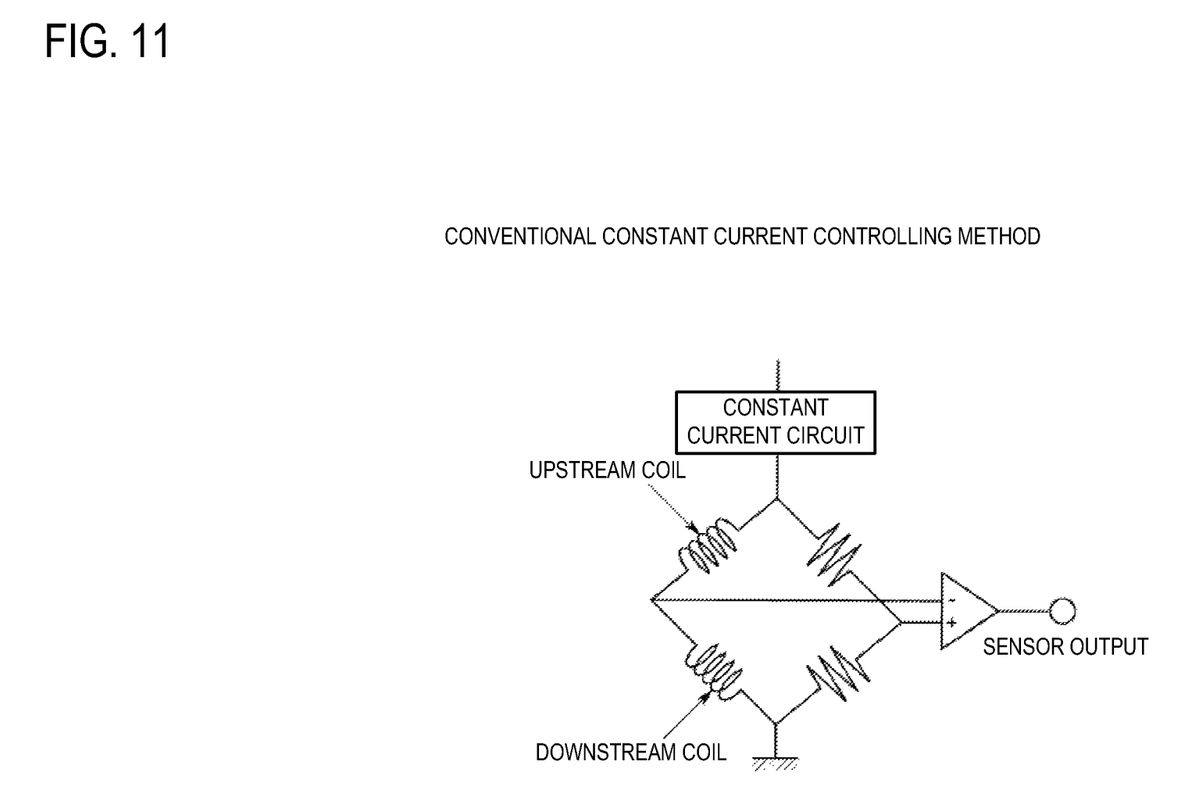
FIG. 11 is a circuit diagram for explaining a conventional constant current method.

The abovementioned problems occur not only with thermal flow rate sensors employing a constant temperature controlling method, but also with thermal flow rate sensors that employ a constant current controlling method and that include, as shown in FIG. 11, a bridge circuit structured by connecting an upstream-side coil and a downstream-side coil in series and a constant current circuit that causes a constant current to flow through the bridge circuit.

CITATION LIST

Patent Literature

Patent Document 1: Japanese Patent Application Laid-open No. 2009-300403

SUMMARY OF INVENTION

Technical Problem

The present invention is directed to solving the abovementioned problems. A main object of the present invention is to improve the linearity of the flow rate output characteristics of a thermal flow rate sensor and to enhance the level of precision of the process to measure an actual gas flow rate.

Solution To Problem

More specifically, the thermal flow rate sensor according to an aspect of the present invention includes: a main flow path through which a fluid flows; and a sensor flow path that branches off from the main flow path so as to cause the fluid to flow in a split flow and is provided with a flow rate detecting mechanism configured to detect a flow rate of the fluid. The flow rate detecting mechanism includes an upstream-side coil and a downstream-side coil each configured by using a heat-generating resistance wire wound around a sensor flow pipe forming the sensor flow path. The thermal flow rate sensor is characterized in that a peak position of a temperature distribution generated in the sensor flow path by the upstream-side coil and the downstream-side coil is positioned on the upstream-side coil side relative to the middle position between the upstream-side coil and the downstream-side coil on the sensor flow path. In this situation, if the upstream-side coil and the downstream-side coil are disposed so as to form a gap therebetween, the middle position between the upstream-side coil and the downstream-side coil is the middle position of the gap, i.e., the middle position between the downstream-side end of the upstream-side coil and the upstream-side end of the downstream-side coil. If the upstream-side coil and the downstream-side coil are disposed so as to be in close contact with each other, the middle position is the position in which the close contact is made, i.e., the downstream-side end of the upstream-side coil (the upstream-side end of the downstream-side coil).

With these arrangements, because the peak position of the temperature distribution generated by the upstream-side coil and the downstream-side coil is positioned on the upstream-side coil side relative to the middle position between the upstream-side coil and the downstream-side coil, it is possible to increase the amount of heat transferred to the downstream-side coil provided on the sensor flow path, by increasing the amount of heat taken by the fluid on the upstream side of the sensor flow path. As a result, it is possible to improve the linearity of the output obtained with the downstream-side coil. It is therefore possible to improve the linearity of the flow rate output characteristics of the thermal flow rate sensor and to enhance the level of precision of the process to measure an actual gas flow rate. Also, according to the present embodiment, because the upstream-side coil and the downstream-side coil that are each configured by using a heat-generating resistance wire are wound around the sensor flow pipe structuring the sensor flow path, it is possible to facilitate the heat transfer between the fluid flowing through the sensor flow path and the coils. It is therefore possible to make the advantageous effects of the present invention even more prominent.

It is desirable to set the temperature of the upstream-side coil to be higher than the temperature of the downstream-side coil. With this arrangement, it is possible to arrange the peak position of the temperature distribution generated by the upstream-side coil and the downstream-side coil to be positioned on the upstream-side coil side relative to the middle position between the upstream-side coil and the downstream-side coil, only by changing the resistance values of the fixed resistors in the one or more bridge circuits including the upstream-side coil and the downstream-side coil, without the need to change the configurations of the upstream-side coil and the downstream-side coil wound around the sensor flow pipe.

It is desirable to arrange the winding width of the upstream-side coil to be larger than the winding width of the downstream-side coil. With this arrangement, it is possible to arrange the peak position of the temperature distribution generated by the upstream-side coil and the downstream-side coil to be positioned on the upstream-side coil side relative to the middle position between the upstream-side coil and the downstream-side coil, only by adjusting the winding widths of the upstream-side coil and the downstream-side coil wound around the sensor flow pipe, without the need to change the circuit configurations of the one or more bridge circuits including the upstream-side coil and the downstream-side coil.

It is desirable to arrange the thermal flow rate sensor so as to include: an upstream-side constant temperature controlling circuit that has a bridge circuit including the upstream-side coil; and a downstream-side constant temperature controlling circuit that has a bridge circuit including the downstream-side coil. When constant-temperature control is exercised over the upstream-side coil and the downstream-side coil in this manner, because it is possible to measure the fluid flowing through the sensor flow path under a constant-temperature condition and because there is no need to take into consideration temperature fluctuations in a conversion factor (a gas-type conversion coefficient: a $C_F$ value), it is possible to obtain an actual gas flow rate value with a high level of precision.

Advantageous Effects of Invention

According to an aspect of the present invention configured as described above, because the peak position of the temperature distribution generated in the sensor flow path by the upstream-side coil and the downstream-side coil is positioned on the upstream-side coil side relative to the middle position between the upstream-side coil and the downstream-side coil on the sensor flow path, it is possible to improve the linearity of the flow rate output characteristics of the thermal flow rate sensor and to enhance the level of precision of the process to measure the actual gas flow rate.

DESCRIPTION OF EMBODIMENTS

Exemplary embodiments of a thermal flow rate sensor according to the present invention will be explained with reference to the drawings.

Figure 1:
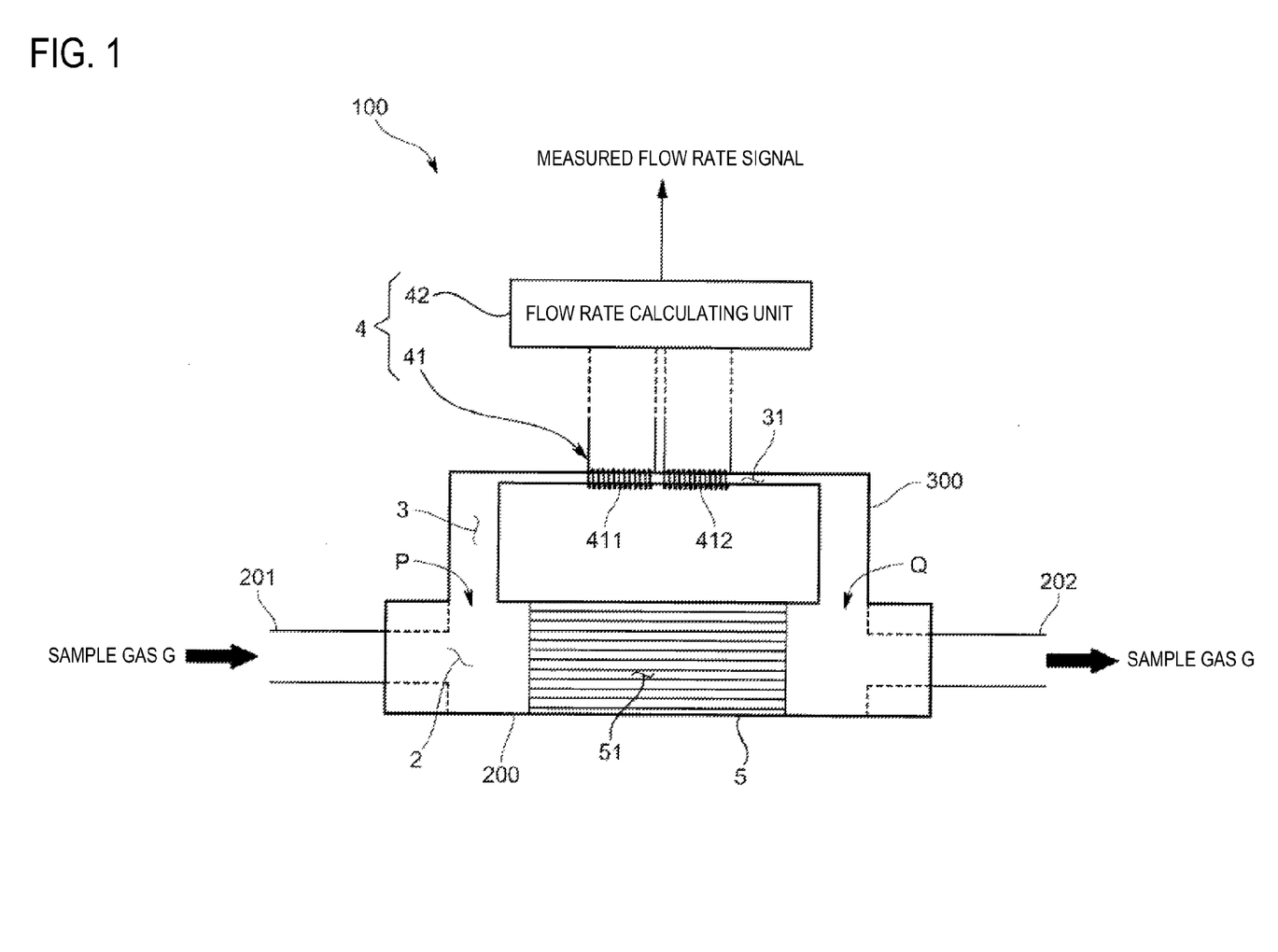
FIG. 1 is a drawing of a schematic configuration of a thermal flow rate sensor according to an embodiment of the present invention.

A thermal flow rate sensor 100 according to an embodiment is a thermal mass flow rate sensor that is used in, for example, a semiconductor production process and includes, as shown in FIG. 1: a main flow path 2 through which a sample gas G (a fluid) (e.g., a semiconductor process gas such as $SF_6$) flows; a sensor flow path 3 that branches off from the main flow path 2 so as to cause the sample gas G to flow in a split flow and to detect a flow rate of the sample gas G; a flow rate detecting mechanism 4 that is configured to detect the flow rate of the sample gas G; and a laminar flow element 5 serving as a resistive element that is provided in the main flow path 2 so as to be positioned between a split point P and a junction point Q of the sensor flow path 3 and that includes a plurality of internal flow paths 51. The laminar flow element 5 is configured to arrange a split ratio between the main flow path 2 and the sensor flow path 3 to be a predetermined designed value and is structured by using resistive members such as bypass elements having constant flow rate characteristics. The laminar flow element 5 may be configured by inserting a plurality of narrow pipes in an outer pipe or by laminating a plurality of thin discs together each of which has numerous through holes formed therein.

The main flow path 2 is formed by a main flow pipe 200 that is substantially linear and has a fluid inflow port 201 and a fluid outflow port 202.

The sensor flow path 3 is formed by a sensor flow pipe 300 with which the main flow pipe 200 is provided and which is configured by using a hollow narrow pipe having the shape of a substantially inverted U. The sensor flow pipe 300 according to the present embodiment is made of metal such as stainless steel, but may also be configured by using other materials. The sensor flow path 3 includes a measuring path 31 that is linear and is provided with the flow rate detecting mechanism 4 configured to detect the flow rate of the sample gas G flowing through the main flow path 2.

The flow rate detecting mechanism 4 includes: a sensor unit 41 configured to detect a flow rate of the split flow flowing through the sensor flow path 3; and a flow rate calculating unit 42 configured to obtain an output signal from the sensor unit 41 and to calculate at least a mass flow rate of the sample gas G flowing through the main flow path 2.

The sensor unit 41 includes: an upstream-side coil (hereinafter, "upstream coil") 411 that is positioned on the upstream side of the measuring path 31 and is structured by winding a heat-generating resistance wire around the outer circumferential surface of the sensor flow pipe 300; and a downstream-side coil (hereinafter, "downstream coil") 412 that is positioned on the downstream side of the measuring path 31 and is structured by winding a heat-generating resistance wire around the outer circumferential surface of the sensor flow pipe 300. The upstream coil 411 and the downstream coil 412 are each configured by using the heat-generating resistance wire of which the electrical resistance value fluctuates in accordance with changes in temperature and are each wound around the outer circumferential surface of a straight portion of the hollow narrow pipe 300 forming the measuring path 31. Because the sensor unit 41 is structured with the upstream coil 411 and the downstream coil 412 that are configured by using the heat-generating resistance wires, it is possible to configure a heating means and a temperature detecting means as one member and it is thereby possible to simplify the configuration of the thermal flow rate sensor.

The flow rate calculating unit 42 is an electric circuit that includes the upstream coil 411 and the downstream coil 412 described above as a part of the configuration thereof. The flow rate calculating unit 42 includes one or more bridge circuits, one or more amplifying circuits, a correcting circuit, and the like. Further, the flow rate calculating unit 42 is configured to calculate the flow rate inside the sensor flow path 3 by detecting an instantaneous flow rate of the sample gas G as an electric signal (a voltage value) while using the sensor units 411 and 412, to also calculate a flow rate of the sample gas G inside the main flow path 2 on the basis of the split ratio between the main flow path 2 and the sensor flow path 3, and to further output a sensor output signal (a measured flow rate signal) in accordance with the calculated flow rate. The specific circuit configuration of the flow rate calculating unit 42 varies depending on whether the unit uses a constant temperature controlling method or a constant current controlling method.

Figure 2:
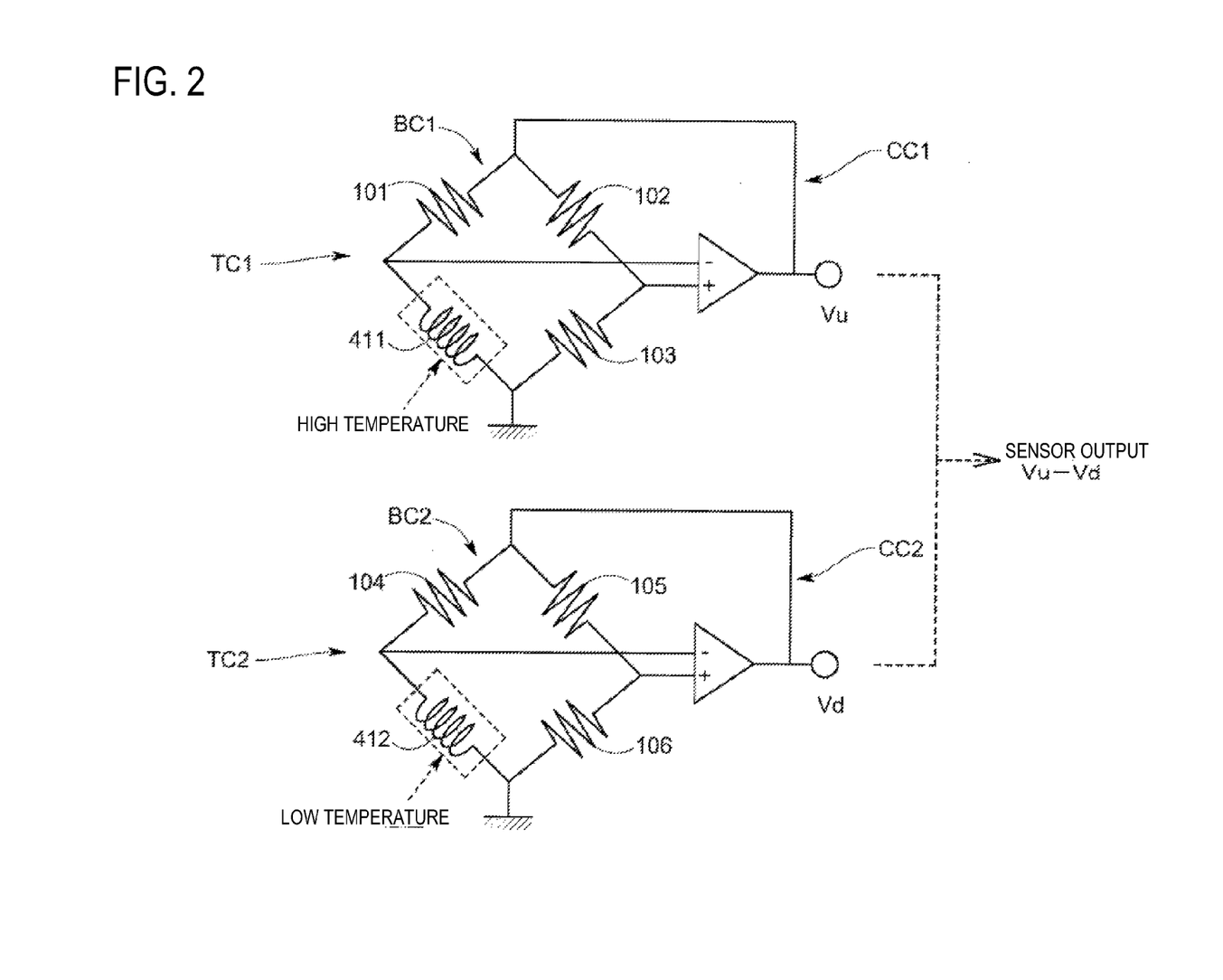
FIG. 2 is a circuit diagram for a constant temperature controlling method according to the embodiment.

The flow rate calculating unit 42 using the constant temperature controlling method includes, as shown in FIG. 2, an upstream-side constant temperature controlling circuit TC1 and a downstream-side constant temperature controlling circuit TC2 that are configured to control the temperatures of the upstream coil 411 and the downstream coil 412 so as to be equal to each other and to be constant at all times.

The upstream-side constant temperature controlling circuit TC1 includes: an upstream-side bridge circuit BC1 in which the upstream coil 411 and a temperature setting resistor 101 for the upstream coil 411 are connected in series, whereas two fixed resistors 102 and 103 are connected in series, while the former set and the latter set are connected in parallel to each other; and a controlling circuit CC1 that is configured to feed back the difference (Vu) between the potential at the connection point of the upstream coil 411 and the temperature setting resistor 101 and the potential at the connection point of the two fixed resistors 102 and 103 to the upstream-side bridge circuit BC1 so as to maintain equilibrium with the upstream-side bridge circuit BC1, the controlling circuit CC1 including an operational amplifier configured to output the potential difference (Vu) from an output terminal.

The downstream-side constant temperature controlling circuit TC2 includes: a downstream-side bridge circuit BC2 in which the downstream coil 412 and a temperature setting resistor 104 for the downstream coil 412 are connected in series, whereas two fixed resistors 105 and 106 are connected in series, while the former set and the latter set are connected in parallel to each other; and a controlling circuit CC2 that is configured to feed back the difference (Vd) between the potential at the connection point of the downstream coil 412 and the temperature setting resistor 104 and the potential at the connection point of the two fixed resistors 105 and 106 to the downstream-side bridge circuit BC2 so as to maintain equilibrium with the downstream-side bridge circuit BC2, the controlling circuit CC2 including an operational amplifier configured to output the potential difference (Vd) from an output terminal.

In this situation, the material of which the upstream coil 411 is made and the material of which the downstream coil 412 is made have mutually the same resistor temperature coefficient. Further, the upstream coil 411 is feedback-controlled by the controlling circuit CC1 so as to have the same resistance value as that of the temperature setting resistor 101. Similarly, the downstream coil 412 is feedback-controlled by the controlling circuit CC2 so as to have the same resistance value as that of the temperature setting resistor 104.

Further, the flow rate calculating unit 42 amplifies, for example, the difference (Vu−Vd) between the output voltage (Vu) that is output from the upstream-side constant temperature controlling circuit TC1 and the output voltage (Vd) that is output from the downstream-side constant temperature controlling circuit TC2 and outputs the result as the sensor output signal (the measured flow rate signal).

Figure 3:
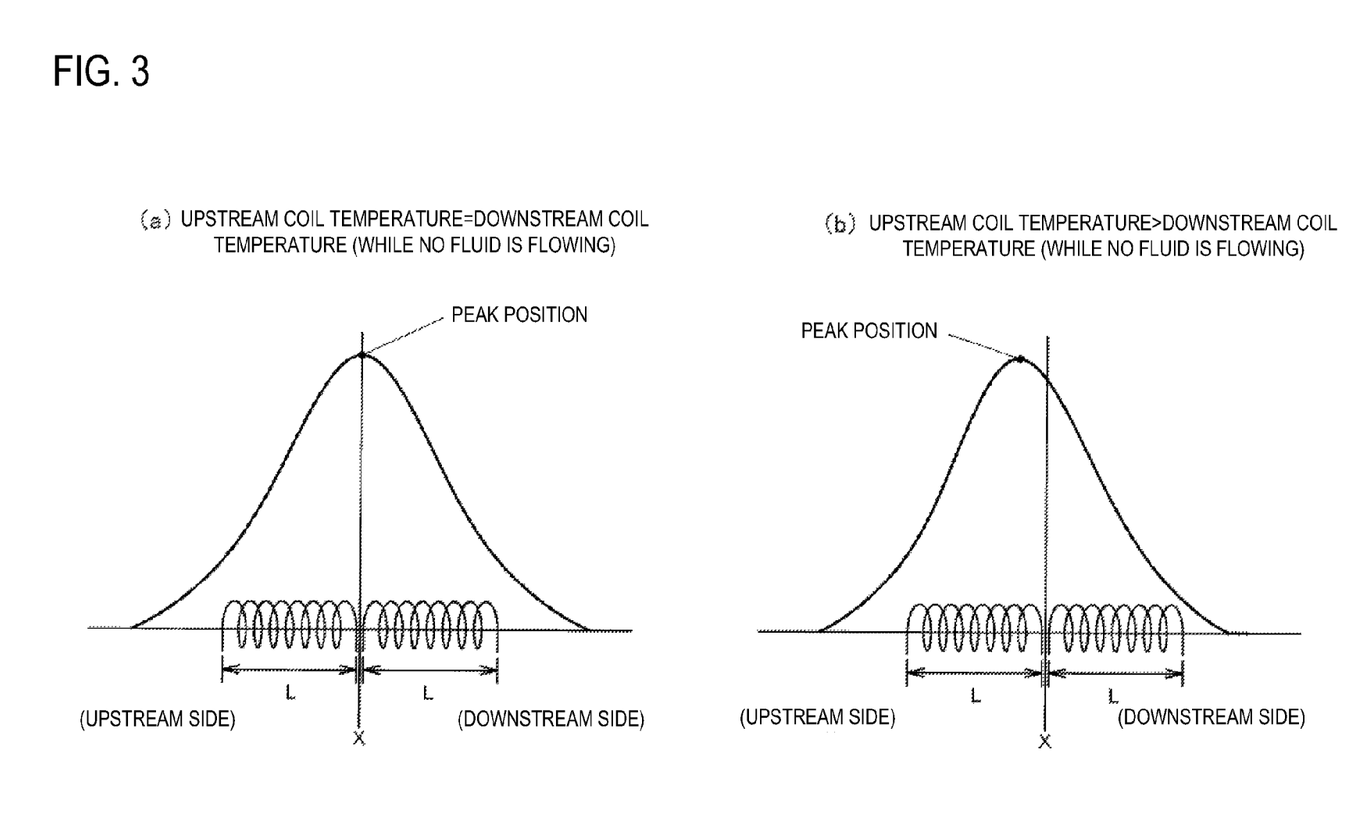
FIGS. 3(a) and 3(b) are charts of temperature distributions with an upstream-side coil and a downstream-side coil according to the embodiment. (The temperature of the upstream-side coil is equal to the temperature of the downstream-side coil in FIG. 3(a), whereas the temperature of the upstream-side coil is higher than the temperature of the downstream-side coil in FIG. 3(b).)

Further, the thermal flow rate sensor 100 according to the present embodiment is configured so that, as shown in FIG. 3(*b*), while no gas is flowing through at least the sensor flow path, a peak position of a temperature distribution generated in the sensor flow path 3 by the upstream coil 411 and the downstream coil 412 is positioned on the upstream coil 411 side relative to a middle position X between the upstream coil 411 and the downstream coil 412 on the sensor flow path 3. More specifically, the temperature of the upstream coil 411 is set to be higher than the temperature of the downstream coil 412, and the amount of the heat generated by the upstream coil 411 is larger than the amount of the heat generated by the downstream coil 412. It should be noted that, because the temperature of the upstream coil 411 is set to be higher than the temperature of the downstream coil 412, the value of (Vu−Vd) is not zero while no gas is flowing through the sensor flow path 3. In this situation, it is desirable if the temperature of the upstream coil 411 is higher than the temperature of the downstream coil 412 by 5° C. or greater, and preferably higher by 10° C. to 20° C. In this situation, the winding width (L) of the upstream coil 411 is equal to the winding width (L) of the downstream coil 412. FIG. 3(a) illustrates a temperature distribution generated in the sensor flow path 3 when the temperatures of the upstream coil and the downstream coil are arranged to be equal while using a conventional constant temperature controlling method.

In the circuit configuration described above using the constant temperature controlling method, it is possible to adjust the temperature of the upstream coil 411 and the temperature of the downstream coil 412 by selecting a resistance value of the temperature setting resistor 101 for the upstream coil 411 and a resistance value of the temperature setting resistor 104 for the downstream coil 412. For example, if the resistance value of the temperature setting resistor 101 for the upstream coil 411 is set to be higher than the resistance value of the temperature setting resistor 104 for the downstream coil 412, the upstream coil 411 has a higher resistance value than the downstream coil 412, which means that the temperature of the upstream coil 411 is higher than the temperature of the downstream coil 412. Thus, the temperature distribution shown in FIG. 3(b) is achieved.

Figure 4:
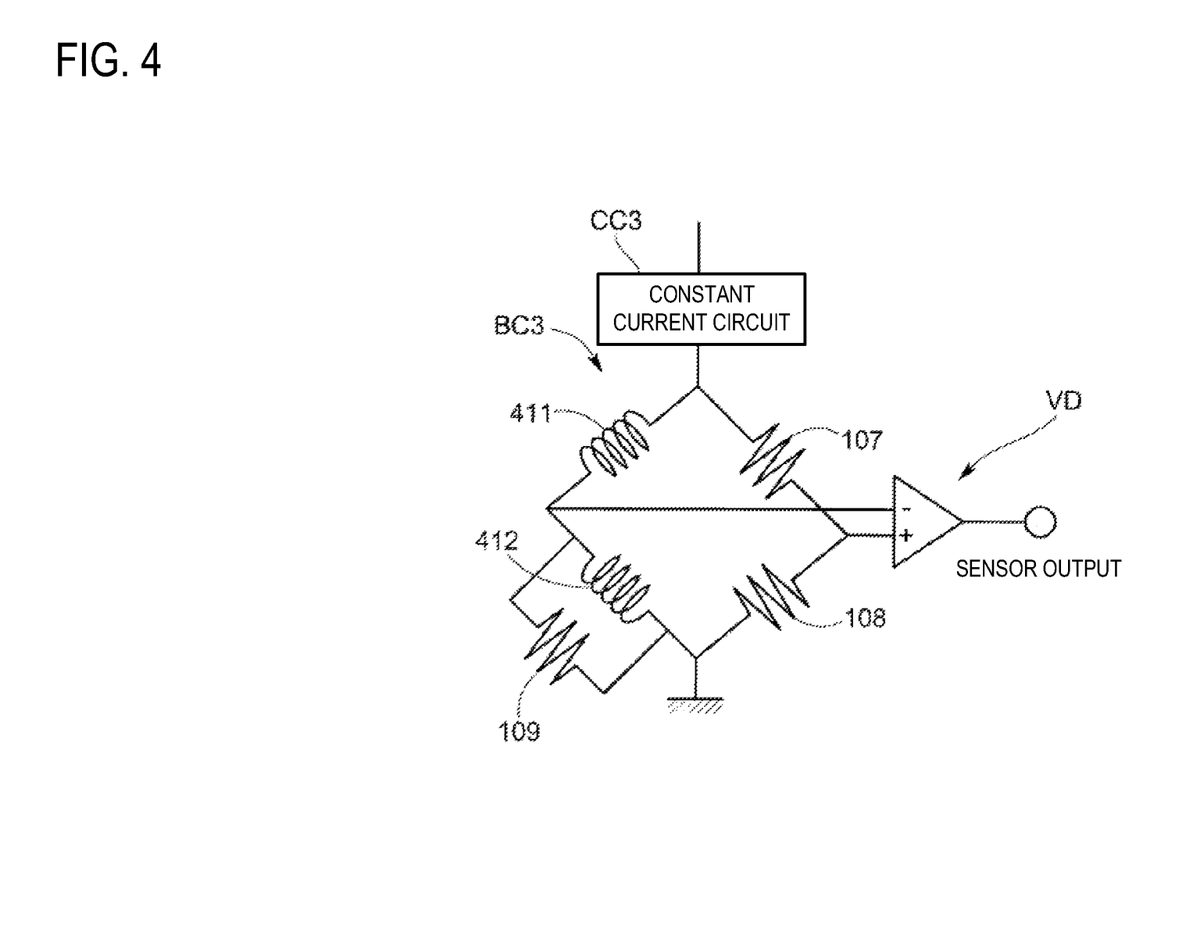
FIG. 4 is a circuit diagram for a constant current controlling method according to the embodiment.

Next, a circuit configuration of the flow rate calculating unit 42 that uses a constant current controlling method is shown in FIG. 4.

The circuit using the constant current controlling method includes: a bridge circuit BC3 in which the upstream coil 411 and the downstream coil 412 are connected in series, whereas two fixed resistors 107 and 108 are connected in series, while the former set and the latter set are connected in parallel to each other; a controlling circuit CC3 that is configured to supply a predetermined constant current to the bridge circuit BC3 and is configured by using, for example, an operational amplifier or a transistor; and a potential difference detecting circuit VD that includes an operational amplifier configured to output the difference between the potential at the connection point of the upstream coil 411 and the downstream coil 412 and the potential at the connection point of the two fixed resistors 107 and 108. The material of which the upstream coil 411 is made and the material of which the downstream coil 412 is made have mutually the same resistor temperature coefficient.

In the configuration according to the present embodiment, as shown in FIG. 4, a fixed resistor 109 is connected in parallel to the downstream coil 412, so as to make the current value flowing through the upstream coil 411 larger than the current value flowing through the downstream coil 412, in order to arrange the temperature of the upstream coil 411 to be higher than the temperature of the downstream coil 412. If the fixed resistor 109 was not connected in parallel, when a constant current is caused to flow in the bridge circuit BC while no fluid is flowing through the sensor flow path 3, the upstream coil 411 and the downstream coil 412 would have mutually the same resistance value.

Besides the present method by which the fixed resistor 109 is connected in parallel to the downstream coil 412, another method is also acceptable by which the ratio between the resistance values of the fixed resistors 107 and 108 is adjusted, so that the ratio between the resistance values of the upstream coil 411 and the downstream coil 412 is adjusted, in order to arrange the temperature of the upstream coil 411 to be higher than the temperature of the downstream coil 412.

Figure 5:
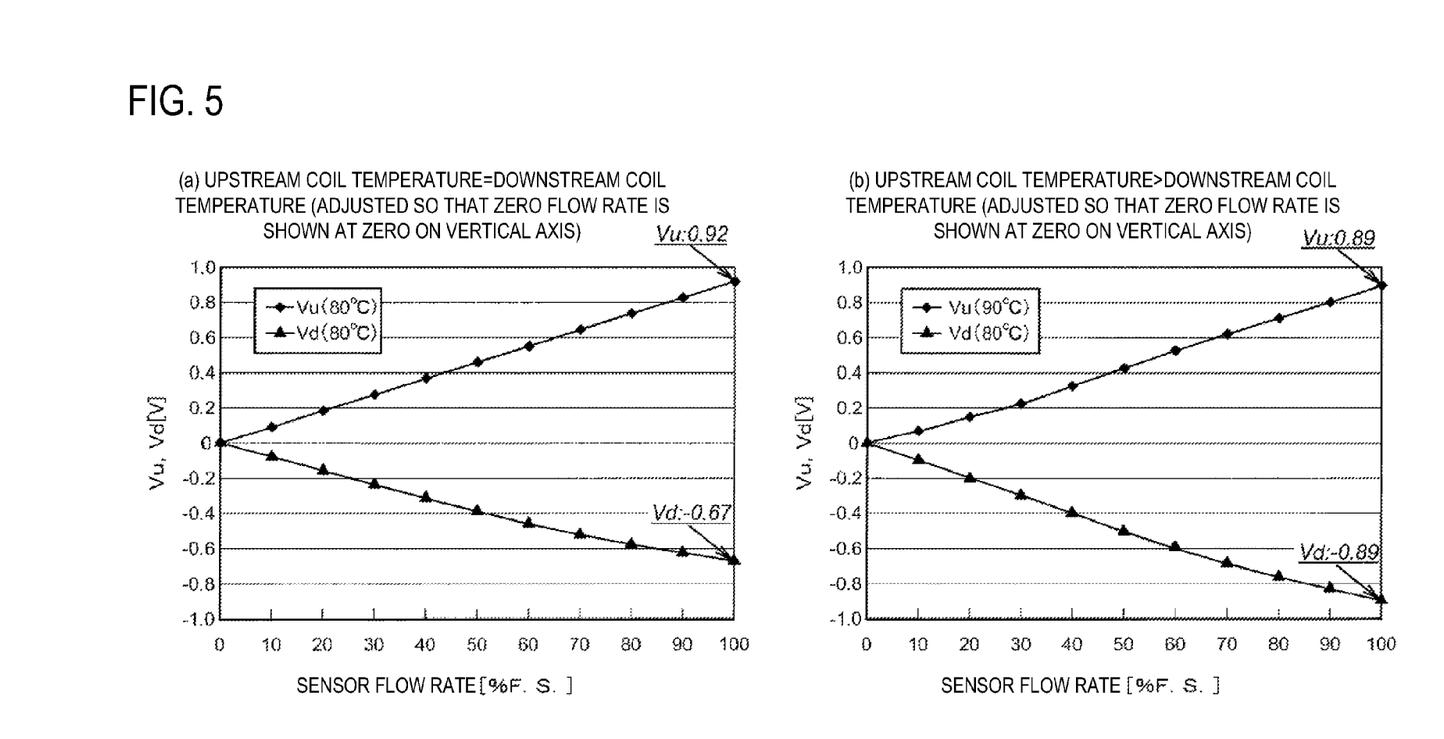
FIGS. 5(a) and 5(b) are charts of relationships between sensor flow rates and output voltages that are output from constant temperature controlling circuits, according to the constant temperature controlling method.
Figure 6:
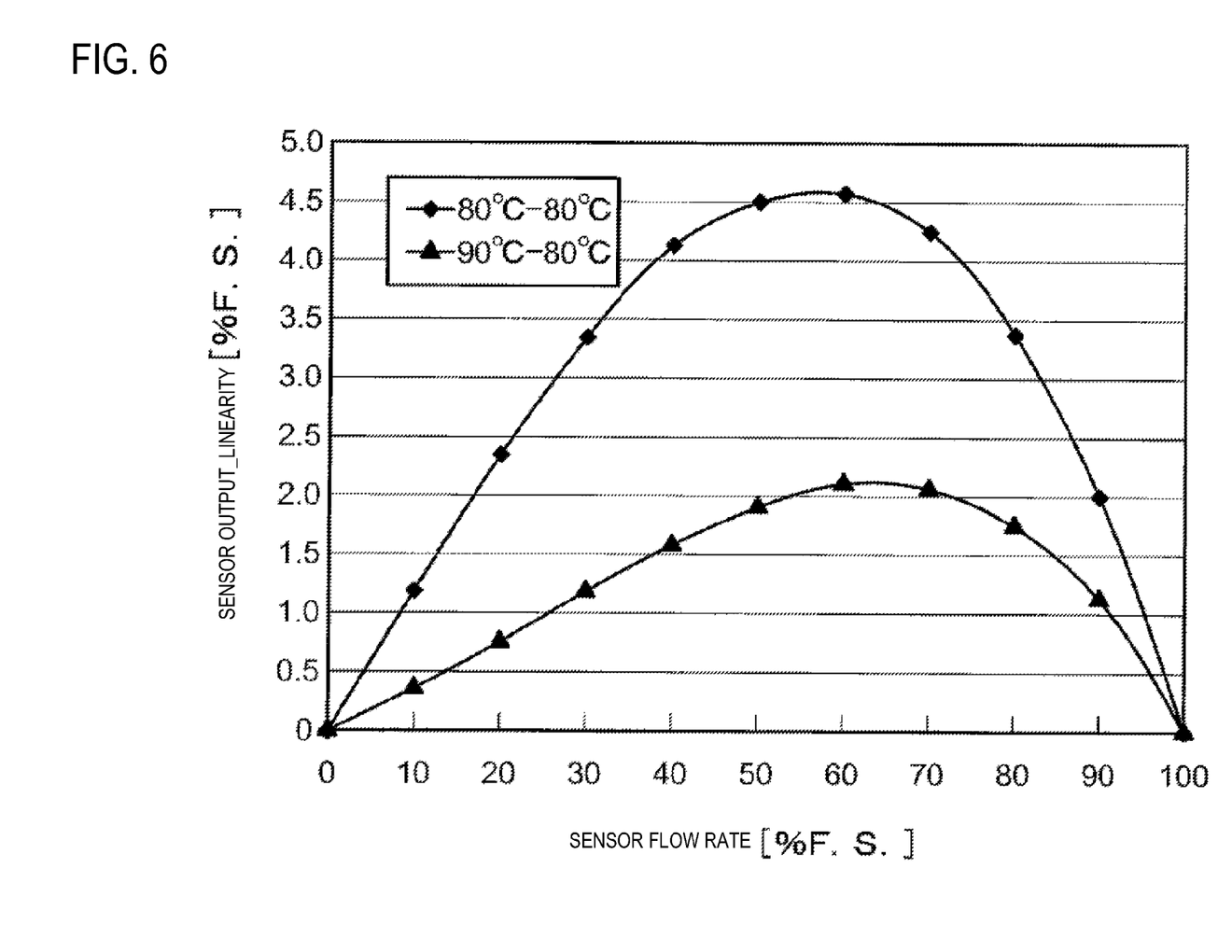
FIG. 6 is a chart of relationships between sensor flow rates and linearity of sensor outputs, according to the constant temperature controlling method.
Figure 7:
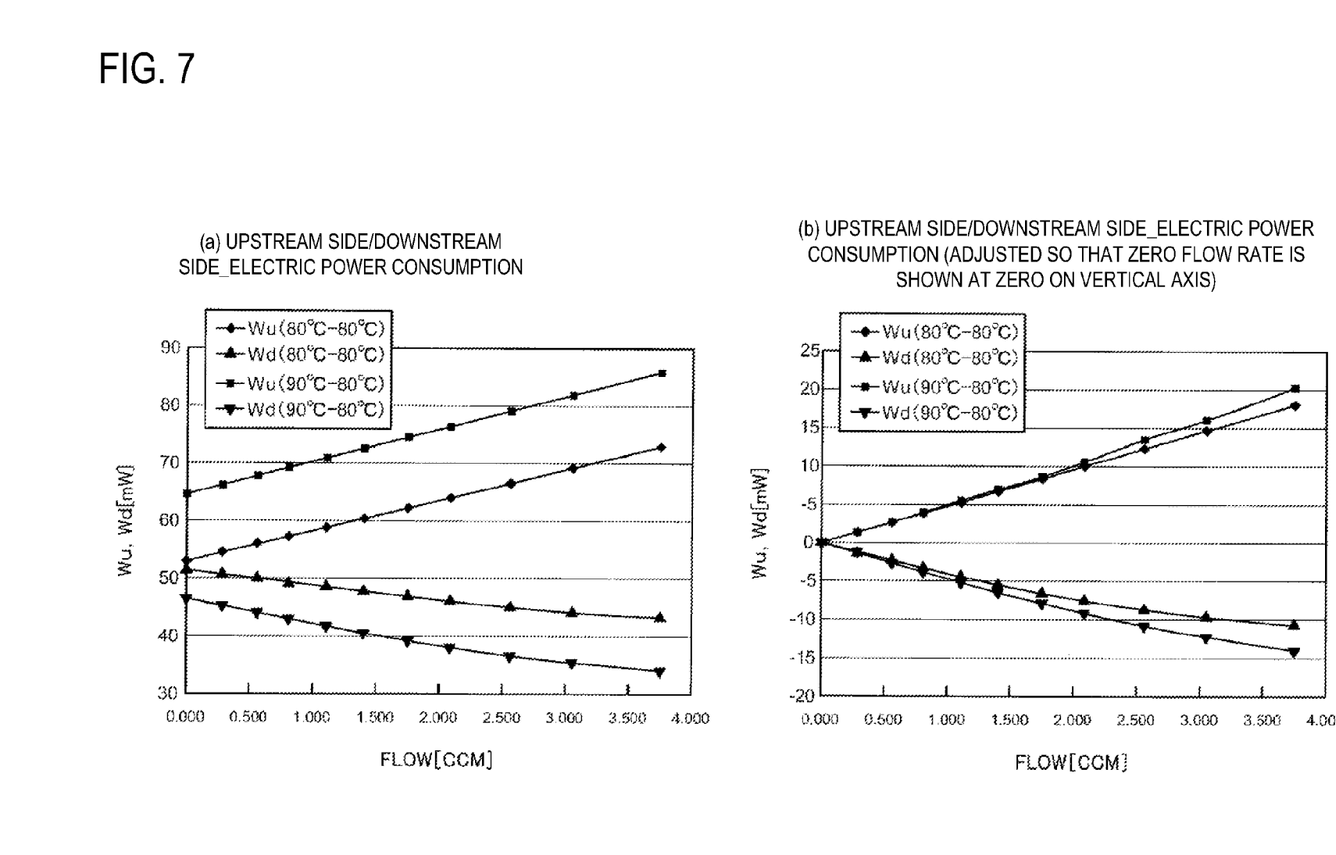
FIGS. 7(a) and 7(b) are charts of relationships between flow rates and electric power consumption of bridge circuits, according to the constant temperature controlling method.

Next, sensor characteristics data obtained by using the thermal flow rate sensor 100 described above that uses the constant temperature controlling method is shown in FIGS. 5 to 7. The data described below is obtained as a result of causing $SF_6$ to flow through the thermal flow rate sensor.

FIG. 5(a) is a chart of sensor characteristics of the conventional thermal flow rate sensor (see FIG. 10), i.e., output characteristics of the output voltage value (Vu) of the upstream-side bridge circuit and the output voltage value (Vd) of the downstream-side bridge circuit with respect to a sensor flow rate (% F. S.) that are observed when the temperatures of the upstream coil and the downstream coil are arranged to be equal (80° C.). FIG. 5(b) is a chart of output characteristics of an output voltage value (Vu) of the upstream-side bridge circuit and an output voltage value (Vd) of the downstream-side bridge circuit with respect to a sensor flow rate (% F. S.) that are observed when the temperature (90° C.) of the upstream coil is arranged to be higher than the temperature (80° C.) of the downstream coil. The sensor flow rate is the flow rate of the fluid flowing through the sensor flow path.

As understood from FIG. 5(a), as the sensor flow rate increases (more specifically, 50% F. S. or higher), the output voltage value (Vd) of the downstream-side bridge circuit tends to become saturated. At 100% F. S., there is no symmetry between the output voltage value (Vu) of the upstream-side bridge circuit and the output voltage value (Vd) of the downstream-side bridge circuit. This is because the amount of heat given to the downstream coil by the fluid flowing through the sensor flow path is smaller than the amount of heat taken from the upstream coil by the fluid. In contrast, as understood from FIG. 5(b), even if the sensor flow rate increases, the output voltage value (Vu) of the upstream-side bridge circuit and the output voltage value (Vd) of the downstream-side bridge circuit both change linearly. At 100% F. S., the output voltage value (Vu) of the upstream-side bridge circuit and the output voltage value (Vd) of the downstream-side bridge circuit are both approximately 0.89 [V] and are symmetrical. This is because the amount of heat taken from the upstream coil by the fluid flowing through the sensor flow path is given to the downstream coil by the fluid, and output voltage (Vd) of the downstream-side circuit tends to become linear.

FIG. 6 illustrates the linearity of the sensor output [% F. S.] with respect to the sensor flow rate [% F. S.] of the mass flow rate sensor, the linearity being obtained on the basis of the output voltage values shown in FIGS. 5(a) and 5(b). The sensor output denotes a measured flow rate signal that is amplified by the flow rate calculating unit 42. It is understood from FIG. 6 that the linearity is improved by 50% or more when the upstream coil is arranged to be 90° C. while the downstream coil is arranged to be 80° C., compared to the situation where both the upstream coil and the downstream coil are arranged to be 80° C.

Further, FIGS. 7(a) and 7(b) illustrate electric power consumption of the bridge circuit including the upstream coil and electric power consumption of the bridge circuit including the downstream coil with respect to flow rates, on the basis of FIGS. 5(a) and 5(b). As understood from FIGS. 7(a) and 7(b), regarding the bridge circuit including the downstream coil, the decrease (the amount of change) in the electric power consumption of the bridge circuit including the downstream coil is more significant than the increase (the amount of change) in the electric power consumption of the bridge circuit including the upstream coil, when the upstream coil is arranged to be 90° C. while the downstream coil is arranged to be 80° C., compared to the situation where both the upstream coil and the downstream coil are heated to mutually the same temperature (80° C.). It is therefore observed that the amount of heat taken from the upstream coil is effectively transferred to the downstream coil.

When the thermal flow rate sensor 100 according to the present embodiment configured as described above is used, because the peak position of the temperature distribution generated by the upstream coil 411 and the downstream coil 412 is positioned on the upstream coil 411 side relative to the middle position X between the upstream coil 411 and the downstream coil 412, it is possible to increase the amount of heat transferred to the downstream coil 412 provided on the downstream side of the sensor flow path 3, by increasing the amount of heat taken by the fluid on the upstream side of the sensor flow path 3. As a result, it is possible to improve the linearity of the output from the downstream coil 412. It is therefore possible to improve the linearity of the flow rate output characteristics and to enhance the level of precision of the process to measure the actual gas flow rate. According to the present embodiment, even if the measuring process is performed on a gas having a high flowing speed or a gas having low heat conductivity, because the peak position of the temperature distribution is positioned on the upstream coil 411 side, it is possible to enlarge the span to the point where the sensor output becomes saturated due to the peak position moving too far into the downstream coil 412 side, and it is therefore possible to improve the linearity. In other words, the peak position appearing on the upstream coil 411 side moves toward the middle position as the flow rate of the fluid increases. After that, the peak position further moves from the middle position toward the downstream coil side where the sensor output is saturated, as the flow rate of the fluid increases. As explained herein, according to the present embodiment, because the peak position of the temperature distribution is, while the flow rate is zero, positioned farther into the upstream side compared to the position (i.e., the middle position) with the conventional thermal flow rate sensor, it is possible to prevent the sensor output from being saturated by a corresponding amount.

Further, according to the present embodiment, because the upstream coil 411 and the downstream coil 412 configured by using the heat-generating resistance wires are wound around the total circumference of the sensor flow pipe 300, which is the hollow narrow pipe structuring the sensor flow path 3, it is possible to have the heat exchanged on the total circumference of the sensor flow path 3. Thus, it is possible to facilitate the heat transfer between a small amount of fluid flowing through the sensor flow path 3 and the coils 411 and 412, and it is therefore possible to make the advantageous effects of the present embodiment even more prominent. Further, by increasing the winding numbers or the winding widths of the upstream coil 411 and the downstream coil 412 that are wound around the sensor flow pipe 300, it is possible to enlarge the area in which the heat is exchanged with the fluid flowing through the sensor flow path 3.

Further, when the thermal flow rate sensor 100 is configured so as to employ the constant temperature controlling method, because the constant-temperature control is exercised over the upstream coil 411 and the downstream coil 412, it is possible to measure the fluid flowing through the sensor flow path 3 under a constant-temperature condition, while improving the linearity of the flow rate output characteristics. It is therefore possible to obtain an actual gas flow rate value with an even higher level of precision, because there is no need to take into consideration the temperature fluctuations in the conversion factor (the gas-type conversion coefficient: the $C_F$ value).

The present invention is not limited to the exemplary embodiments described above.

Figure 8:
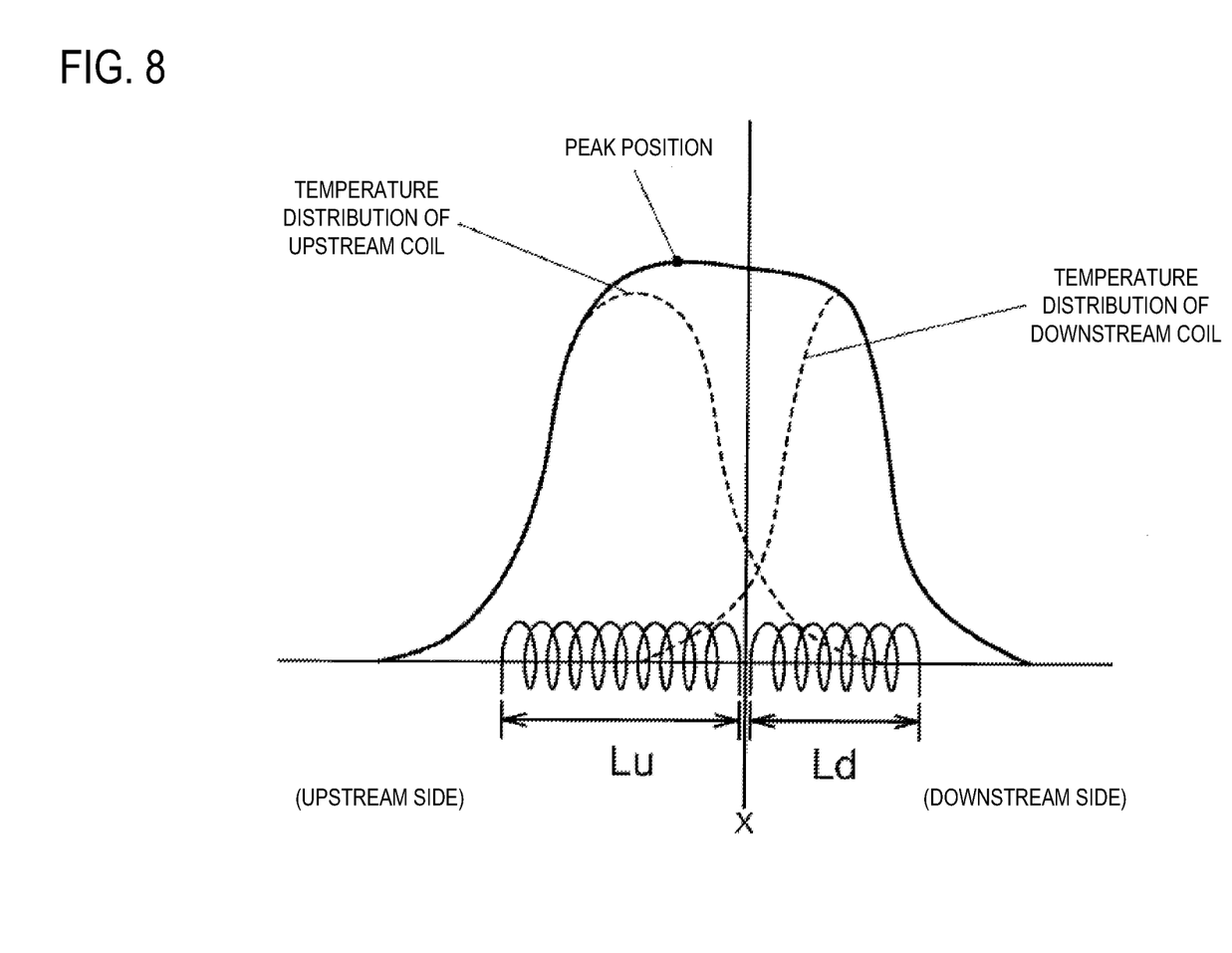
FIG. 8 is a circuit diagram of a thermal flow rate sensor according to a modified embodiment.

For example, as shown in FIG. 8, the winding width (Lu) of the upstream coil 411 may be configured to be larger than the winding width (Ld) of the downstream coil 412. With this configuration also, it is possible to arrange the peak position of the temperature distribution generated by the upstream coil 411 and the downstream coil 412 to be positioned on the upstream coil 411 side relative to the middle position X between the upstream coil 411 and the downstream coil 412. It should be noted that, although the average coil temperatures of the upstream coil 411 and the downstream coil 412 are equal, when the temperature distributions of the coils 411 and 412 are put together as indicated with the dotted lines in FIG. 8, the peak position of the temperature distribution is positioned on the upstream coil 411 side relative to the middle position X.

Further, the mass flow sensor 100 according to the embodiment described above may be used in a mass flow controller Z. In that situation, because it is possible to measure a flow rate with a high level of precision and a high level of sensitivity in a low-vacuum region, the mass flow controller Z is capable of realizing flow rate control with an extremely high level of precision.

Figure 9:
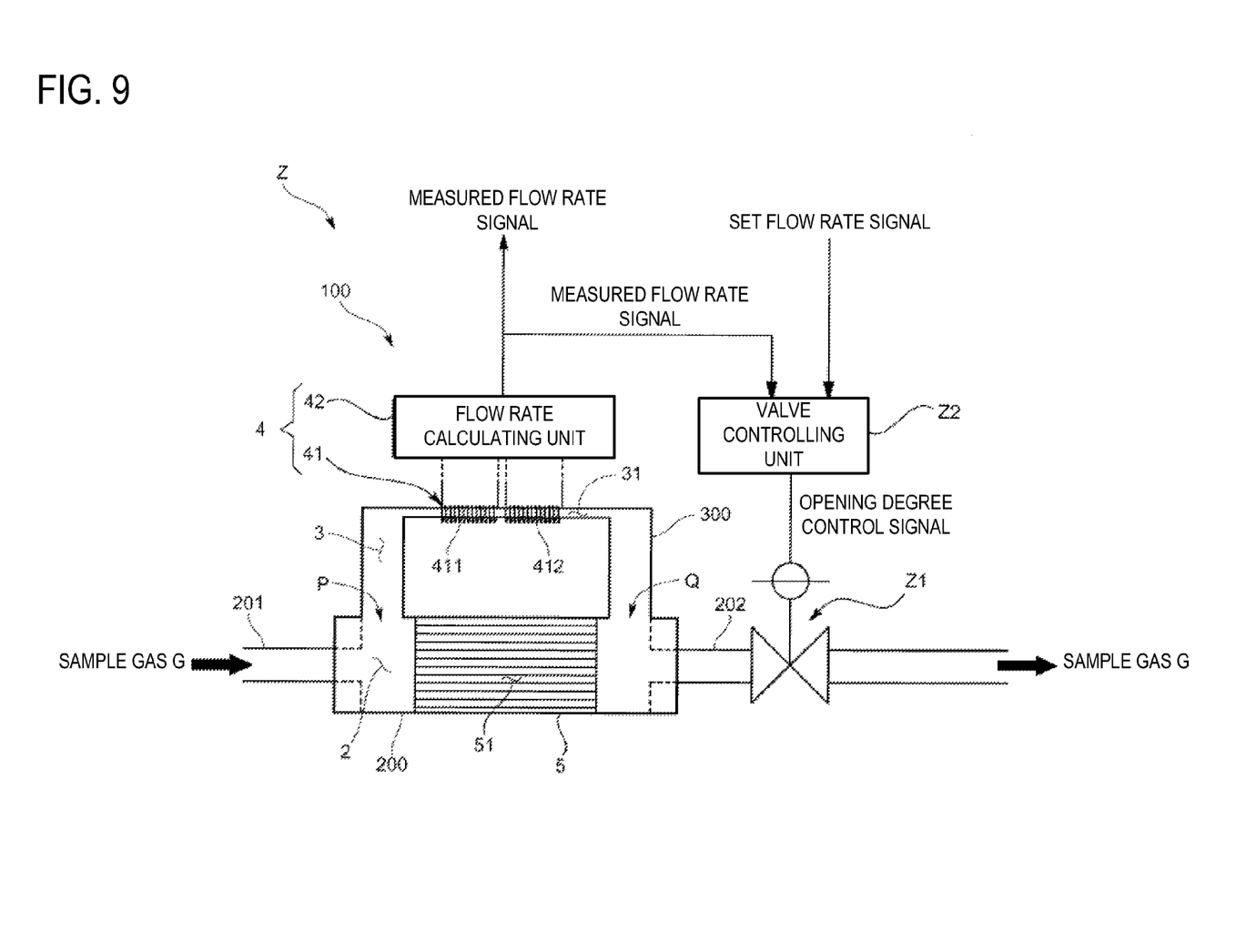
FIG. 9 is a diagram of a configuration of a mass flow controller that uses a thermal flow rate sensor according to the present invention.

In a specific mode of the mass flow controller Z having the mass flow rate sensor 100 incorporated therein, for example, the mass flow controller Z includes, as shown in FIG. 9: the mass flow rate sensor 100 according to the embodiment described above; a flow rate controlling valve Z1 provided on the downstream side relative to the junction point Q with the main flow path 2; and a valve controlling unit Z2 that controls the valve opening degree of the flow rate controlling valve Z1, on the basis of a signal value (a measured flow rate value) indicated by the measured flow rate signal that is output by the mass flow rate sensor 100 and a set flow rate value representing a target flow rate indicated by a set flow rate signal that is input through an input means (not shown).

Further, although a small gap is formed between the upstream coil and the downstream coil, it is also acceptable to omit the gap. When the upstream coil and the downstream coil are disposed so as to form a gap therebetween, it is desirable to position the upstream coil and the downstream coil so as to be close to each other in such a manner that the temperature distribution generated by the upstream coil and the downstream coil in the sensor flow path 3 has a single peak.

Further, in the exemplary embodiments described above, the material of which the upstream coil is made and the material of which the downstream coil is made have mutually the same resistor temperature coefficient. However, it is also acceptable to arrange the upstream coil to have a higher temperature than the downstream coil, by configuring the upstream coil and the downstream coil using materials that have mutually-different resistor temperature coefficients. Furthermore, even if the winding width of the upstream coil is arranged to be smaller than the winding width of the downstream coil, it is acceptable to arrange the peak position of the temperature distribution generated in the sensor flow path so as to be positioned on the upstream coil side, by arranging the heating temperature for the upstream coil to be higher than the heating temperature for the downstream coil. As another example, even if the heating temperature for the upstream coil is arranged to be lower than the heating temperature for the downstream coil, it is acceptable to arrange the peak position of the temperature distribution generated in the sensor flow path so as to be positioned on the upstream coil side, by arranging the winding width of the upstream coil to be larger than the winding width of the downstream coil. In other examples, it is possible to set the winding widths and the heating temperatures of the upstream coil and the downstream coil in various manners so as to arrange the peak position of the temperature distribution generated in the sensor flow path to be positioned on the upstream coil side. In those situations, the winding widths and the heating temperatures of the upstream coil and the downstream coil are set in various manners so as to achieve a desired level of precision for the measuring process.

Furthermore, the flow rate calculating unit 42 may be configured so as to exercise control by turning on and off the current flowing in the upstream coil and turning on and off the current flowing in the downstream coil, so as to arrange the temperature of the upstream coil to be higher than the temperature of the downstream coil, by arranging the duty ratio in the on-off control of the upstream coil to be higher than the duty ratio in the on-off control of the downstream coil.

The mass flow rate sensor and the mass flow controller according to the exemplary embodiments described above may be used for purposes other than a semiconductor production process.

Furthermore, besides the exemplary embodiments described above, the present invention may be applied to a thermal flow rate sensor configured to detect a flow rate of a fluid that is a liquid or the like.

A part or all of the exemplary embodiments described above and modified embodiments may be combined together, as necessary. Further, the present invention is not limited to the exemplary embodiments described above, and needless to say, various types of modifications are possible without departing from the gist thereof.

REFERENCE CHARACTERS LIST 100 thermal flow rate sensor
2 main flow path
200 main flow pipe
3 sensor flow path
300 sensor flow pipe
4 flow rate detecting mechanism
411 upstream-side coil (upstream coil)
412 downstream-side coil (downstream coil)
BC1, BC2 bridge circuit
CC1, CC2 controlling circuit
BC3 bridge circuit
CC3 controlling circuit

The invention claimed is:

1. A thermal flow rate sensor comprising:
a main flow path through which a fluid flows; and
a sensor flow path that branches off from the main flow path so as to cause the fluid to flow in a split flow and that is provided with a flow rate detecting mechanism configured to detect a flow rate of the fluid;
wherein the flow rate detecting mechanism includes an upstream-side coil having a resistor temperature coefficient and a downstream-side coil having the same resistor temperature coefficient as the upstream-side coil, each configured by using a heat-generating resistance wire wound around a sensor flow pipe forming the sensor flow path; and
a resistor connected in parallel to only the downstream-side coil, wherein a peak position of a temperature distribution generated in the sensor flow path by the upstream-side coil, the downstream-side coil, and the resistor connected in parallel to only the downstream-side coil is positioned on the upstream-side coil side relative to a middle position between the upstream-side coil and the downstream-side coil on the sensor flow path.

2. The thermal flow rate sensor according to claim 1, comprising:
an upstream-side constant temperature controlling circuit that has a bridge circuit including the upstream-side coil; and
a downstream-side constant temperature controlling circuit that has a bridge circuit including the downstream-side coil.

3. A thermal flow rate sensor comprising:
a main flow path through which a fluid flows; and
a sensor flow path that branches off from the main flow path so as to cause the fluid to flow in a split flow and is provided with a flow rate detecting mechanism configured to detect a flow rate of the fluid;
wherein the flow rate detecting mechanism includes an upstream-side coil and a downstream-side coil each configured by using a heat-generating resistance wire wound around a sensor flow pipe forming the sensor flow path; and
wherein a resistance value of a first temperature setting resistor for the upstream-side coil is set to be higher than a resistance value of a second temperature setting resistor for the downstream-side coil, such that a heating temperature for the upstream-side coil is higher than a heating temperature for the downstream-side coil.

4. The thermal flow rate sensor according to claim 3, comprising:
an upstream-side constant temperature controlling circuit that has a bridge circuit including the upstream-side coil; and
a downstream-side constant temperature controlling circuit that has a bridge circuit including the downstream-side coil.

5. A thermal flow rate sensor comprising:
a main flow path through which a fluid flows; and
a sensor flow path that branches off from the main flow path so as to cause the fluid to flow in a split flow and is provided with a flow rate detecting mechanism configured to detect a flow rate of the fluid;
wherein the flow rate detecting mechanism includes an upstream-side coil and a downstream-side coil each configured by using a heat-generating resistance wire wound around a sensor flow pipe forming the sensor flow path; and
wherein a winding width of the upstream-side coil is configured to be larger than a winding width of the downstream-side coil, so that a peak position of a temperature distribution of a whole of the upstream-side coil and the downstream-side coil is on the upstream-side relative to a middle position between the upstream-side coil and the downstream-side coil.

6. The thermal flow rate sensor according to claim 5, comprising:
an upstream-side constant temperature controlling circuit that has a bridge circuit including the upstream-side coil; and
a downstream-side constant temperature controlling circuit that has a bridge circuit including the downstream-side coil.

7. A thermal flow rate sensor comprising:
a main flow path through which a fluid flows; and
a sensor flow path that branches off from the main flow path so as to cause the fluid to flow in a split flow and is provided with a flow rate detecting mechanism configured to detect a flow rate of the fluid;
wherein the flow rate detecting mechanism includes an upstream-side coil member and a downstream-side coil member each configured by using a heat-generating resistance wire wound around a sensor flow pipe forming the sensor flow path; and wherein a winding width of the upstream-side coil member is configured to be smaller than a winding width of the downstream-side coil member, and wherein the upstream-side coil member has a higher resistance value than a resistance value of the downstream-side coil member such that a heating temperature on the upstream side is higher than the downstream side.

8. The thermal flow rate sensor according to claim 7, comprising:
an upstream-side constant temperature controlling circuit that has a bridge circuit including the upstream-side coil member; and
a downstream-side constant temperature controlling circuit that has a bridge circuit including the downstream-side coil member.

9. A thermal flow rate sensor comprising:
a main flow path through which a fluid flows; and
a sensor flow path that branches off from the main flow path so as to cause the fluid to flow in a split flow and is provided with a flow rate detecting mechanism configured to detect a flow rate of the fluid;
wherein the flow rate detecting mechanism includes an upstream-side coil member and a downstream-side coil member each configured by using a heat-generating resistance wire wound around a sensor flow pipe forming the sensor flow path; and
wherein a first material of the upstream-side coil member has a first resistor temperature coefficient, and a second material of the downstream-side coil member has a second resistor temperature coefficient that is different from the first resistor temperature coefficient, the different first and second resistor temperature coefficients allowing for a heating temperature on the upstream side to be higher than the downstream side.

10. The thermal flow rate sensor according to claim 9, comprising:
an upstream-side constant temperature controlling circuit that has a bridge circuit including the upstream-side coil member; and
a downstream-side constant temperature controlling circuit that has a bridge circuit including the downstream-side coil member.

11. A thermal flow rate sensor comprising:
a main flow path through which a fluid flows; and
a sensor flow path that branches off from the main flow path so as to cause the fluid to flow in a split flow and is provided with a flow rate detecting mechanism configured to detect a flow rate of the fluid;
wherein the flow rate detecting mechanism includes an upstream-side coil member and a downstream-side coil member each configured by using a heat-generating resistance wire wound around a sensor flow pipe forming the sensor flow path; and
wherein the upstream-side coil member is configured with a first on-off current control, and the downstream-side coil member is configured with a second on-off current control, wherein the first and second on-off current controls turn on and off currents flowing in the upstream-side coil member and the downstream-side coil member, respectively, and wherein the upstream-side coil member has a higher duty ratio than a duty ratio of the downstream-side coil member such that a heating temperature on the upstream side is higher than the downstream side.

12. The thermal flow rate sensor according to claim 11, comprising:
an upstream-side constant temperature controlling circuit that has a bridge circuit including the upstream-side coil member; and
a downstream-side constant temperature controlling circuit that has a bridge circuit including the downstream-side coil member.

* * * * *